(12) United States Patent
Hart et al.

(10) Patent No.: US 9,382,998 B1
(45) Date of Patent: Jul. 5, 2016

(54) INTERPLANETARY CLUTCH ACTUATOR

(71) Applicant: GM Global Technology Operations LLC, Detroit, MI (US)

(72) Inventors: James M. Hart, Belleville, MI (US); Daryl A. Wilton, Macomb, MI (US)

(73) Assignee: GM Global Technnology Operations, LLC, Detroit, MI (US)

( * ) Notice: Subject to any disclaimer, the term of this patent is extended or adjusted under 35 U.S.C. 154(b) by 0 days.

(21) Appl. No.: 14/688,615

(22) Filed: Apr. 16, 2015

(51) Int. Cl.
F16H 31/00 (2006.01)
F16H 57/08 (2006.01)
F16H 3/44 (2006.01)
F16H 63/04 (2006.01)

(52) U.S. Cl.
CPC .................. *F16H 57/08* (2013.01); *F16H 3/44* (2013.01); *F16H 57/082* (2013.01); *F16H 63/04* (2013.01); *F16H 2003/442* (2013.01); *F16H 2057/087* (2013.01); *F16H 2704/00* (2013.01)

(58) Field of Classification Search
CPC ....... F16H 57/08; F16H 57/082; F16H 63/04; F16H 3/44; F16H 2033/442; F16H 2057/087
See application file for complete search history.

(56) References Cited

U.S. PATENT DOCUMENTS

| | | | | |
|---|---|---|---|---|
| 2006/0281599 A1* | 12/2006 | Murakami | ............. | B60K 17/20 475/249 |
| 2009/0069141 A1* | 3/2009 | Ziemer | ............... | F16H 63/3026 475/269 |
| 2012/0217124 A1* | 8/2012 | Janson | .................... | F16H 57/08 192/41 R |
| 2014/0041981 A1* | 2/2014 | Floro | ..................... | F16H 57/082 192/20 |
| 2014/0353107 A1* | 12/2014 | Hemphill | ................ | F16D 41/00 192/20 |
| 2015/0176661 A1* | 6/2015 | Diemer | ............... | F16D 25/0635 192/85.18 |

* cited by examiner

Primary Examiner — David J Hlavka

(57) ABSTRACT

An assembly for use in a transmission of a motor vehicle includes a planetary gear set that defines an axis of rotation and includes a planetary carrier member, the planetary carrier member having at least one window. A piston is disposed on a first side of the planetary gear set and a clutch pack is disposed on a second side of the planetary gear set opposite the first side. An interplanetary actuator is in contact with the piston and the clutch pack and is slidably disposed in the window of the planetary carrier member. Actuation of the piston in turn translates the interplanetary actuator to engage the clutch pack.

20 Claims, 2 Drawing Sheets

INTERPLANETARY CLUTCH ACTUATOR

FIELD

The invention relates generally to an interplanetary clutch actuator, and more particularly to an interplanetary clutch actuator in a transmission of a motor vehicle that allows a piston and plate clutch pack to be located on opposite sides of a planetary gear set.

BACKGROUND

The statements in this section merely provide background information related to the present disclosure and may or may not constitute prior art.

A typical multi-speed automatic transmission uses a combination of torque transmitting devices, such as clutches, dog clutches/synchronizers, or brakes, to achieve a plurality of forward and reverse gear or speed ratios as well as a Neutral and a Park. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the toque transmitting devices to provide the desired speed ratios.

In order to engage the torque transmitting devices, a typical automatic transmission includes a hydraulic clutch control system that employs a hydraulic fluid to selectively actuate pistons within the torque transmitting devices. Actuation of a piston in turn engages by compression the torque transmitting elements (i.e., reaction discs or plates) within the torque transmitting device to allow torque transmission through the torque transmitting device.

Packaging of the components of the automatic transmission depends on many factors including, but not limited to, the footprint of the transmission housing, the physical connections between the gear sets and shafts which require proper bearing support within the housing, the location of clutches and brakes and their actuators, and the hydraulic fluid routing required to control the clutches and brakes as well as provide lubrication and cooling. Therefore, there is a constant need in the art to solve particular packaging problems with new and useful transmission assemblies.

SUMMARY

An assembly for use in a transmission of a motor vehicle is provided. The assembly includes a planetary gear set that defines an axis of rotation and includes a planetary carrier member, the planetary carrier member having at least one window. A piston is disposed on a first side of the planetary gear set and a clutch pack is disposed on a second side of the planetary gear set opposite the first side. An interplanetary actuator is in contact with the piston and the clutch pack and is slidably disposed in the window of the planetary carrier member. Actuation of the piston in turn translates the interplanetary actuator to engage the clutch pack.

In one aspect the interplanetary actuator includes an annular plate portion having a clutch contact surface in contact with the clutch pack.

In another aspect the interplanetary actuator includes at least one tab member connected to the annular plate portion and disposed within the window of the planetary carrier member.

In yet another aspect the tab member is connected to an inner periphery of the annular plate portion and extends axially from the annular plate portion.

In yet another aspect the piston includes a circumferential groove, and an end portion of the tab member is disposed within the circumferential groove.

In yet another aspect the tab member includes an axial protrusion on the end portion and wherein the axial protrusion is disposed within a slot formed in the groove of the piston.

In yet another aspect the planetary carrier member includes a first set of pinion pin holes and a second set of pinion pin holes, and a first set of pinion pins rotatably supporting a first set of planetary gears are disposed in the first set of pinion pin holes and a second set of pinion pins rotatably supporting a second set of planetary gears are disposed in the second set of pinion pin holes.

In yet another aspect the window is disposed between, and angularly offset from, adjacent first and second pinion pin holes in the planetary carrier member.

In yet another aspect the piston is disposed within a piston housing, and a backing plate is connected to the piston housing and sealed to the piston.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
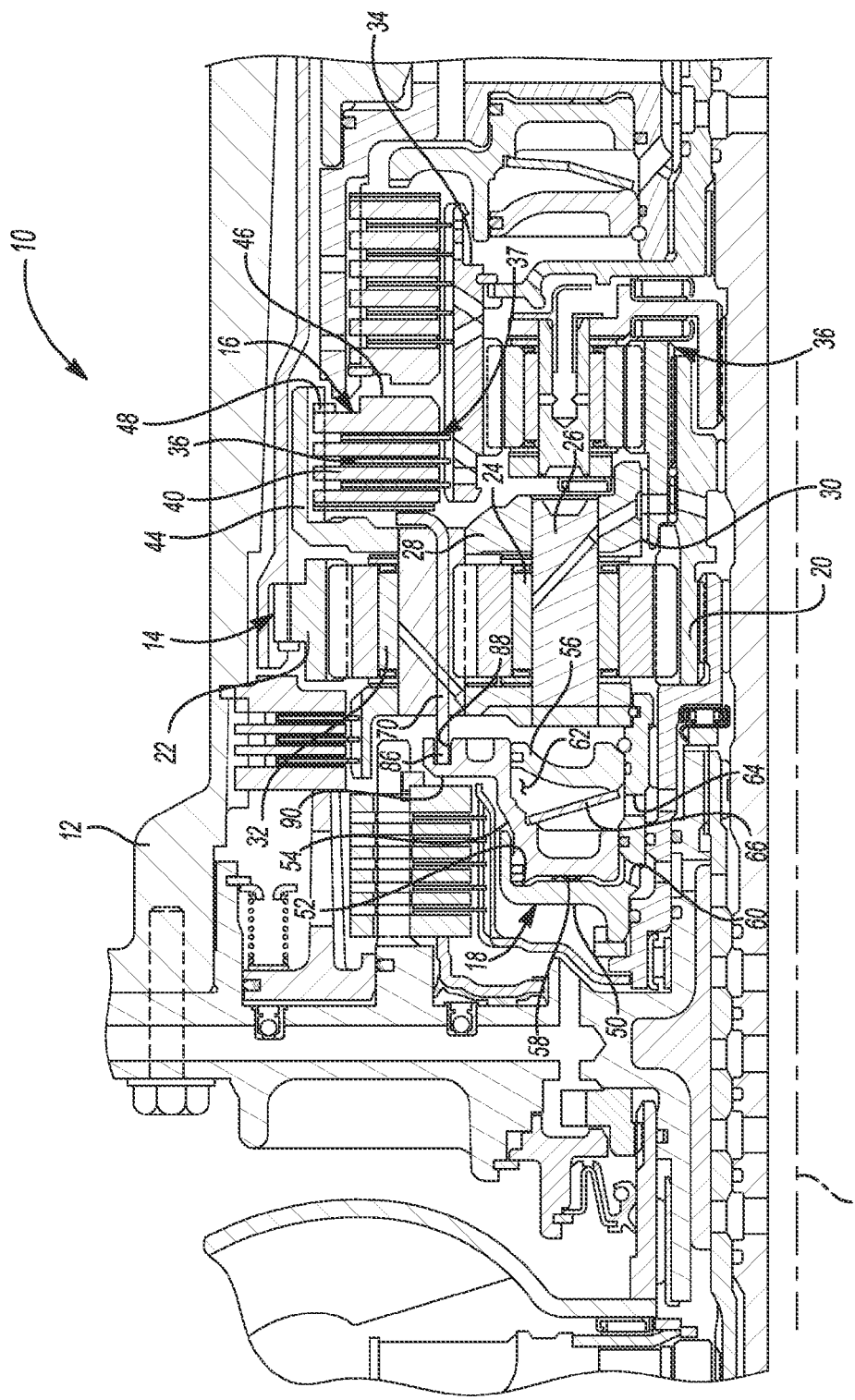
FIG. 1 is a cross-sectional view of a portion of an exemplary transmission having an interplanetary clutch actuator assembly according to the principles of the present invention.

With reference to FIG. 1, a portion of a transmission is generally indicated by reference number 10. The transmission 10 is illustrated as a rear wheel drive automatic transmission for use in a motor vehicle (not shown). However, it should be appreciated that the transmission 10 may be a front wheel drive transmission without departing from the scope of the present disclosure. The transmission 10 includes a typically cast, metal housing 12 which encloses and protects the various components of the transmission 10. The housing 12 includes a variety of apertures, passageways, shoulders and flanges which position and support these components. Generally speaking, the transmission 10 includes a planetary gear set 14, a torque transmitting device 16, specifically a clutch in the example provided, and an interplanetary clutch actuator assembly 18. It should be appreciated that the transmission 10 may include various other components including, but not limited to, planetary gear sets, shafts and interconnecting members, additional clutches and/or brakes, and additional piston and actuator assemblies.

The planetary gear set 14 is illustrated as a compound planetary gear set though it should be appreciated that the planetary gear set 14 may be a simple planetary gear set or other type of planetary gear set without departing from the scope of the present invention. The planetary gear set 14 includes a sun gear member 20, a ring gear member 22, and a planet carrier member 24 each rotatable about an axis of rotation 25. The planet carrier member 24 supports a first set of planet pins 26 and a second set of planet pins 28. A first set of planet gears 30 are supported for rotation on the first set of planet pins 26 and a second set of planet gears 32 are supported for rotation on the second set of planet pins 28. The first set of planet gears 30 are each in mesh with both the sun gear member 20 and the second set of planet gears 32. The second set of planet gears 32 are each in mesh with the first set of planet gears 30 and the ring gear member 22.

The planet carrier member 24 is connected to the clutch 16. The clutch 16 selectively couples the planet carrier member 24 to another rotatable member, for example a ring gear 34 of a second planetary gear set 36. The clutch 16 includes a plate clutch pack 37 having plurality of friction discs 38 interleaved with a plurality of clutch plates 40. The friction discs 38 are splined to the ring gear 34 of the second planetary gear set 36. The clutch plates 40 are splined to an inner surface of an axially extending flange 44 of the planet carrier member 24. Both the friction discs 38 and clutch plates 40 are moveable in an axial direction by the interplanetary clutch actuator assembly 18. A backing plate 46 limits axial movement of the friction discs 38 and the clutch plates 40. The backing plate 46 is splined to the planetary carrier member 24 at an end of the clutch 16 and is restrained from axial movement by a snap ring 48.

The interplanetary clutch actuator assembly 18 is configured to selectively engage the clutch 16 upon receipt of a hydraulic control signal. The interplanetary clutch actuator assembly 18 includes a piston housing 50. The piston housing 50 is located on an opposite side of the planetary gear set 14 than the clutch 16. The piston housing 50 defines a piston cylinder 52. A piston 54 is slidably disposed within the piston cylinder 52. A backing plate 56 is sealed to the piston housing 50 and to the piston 54. The piston cylinder 52 and the piston 54 define an apply side pressure chamber 58. An apply side fluid port 60 in the piston housing 50 feeds the apply side pressure chamber 58 with hydraulic fluid when commanded by a hydraulic control system (not shown) in the transmission 10. The backing plate, the piston housing 50, and the piston 54 define a release side pressure chamber 62. The release side pressure chamber 62 is located on an opposite side of the piston 54 as the apply side pressure chamber 58. A release side fluid port 64 in the piston housing 50 feeds the release side pressure chamber 58 with hydraulic fluid. A biasing member 66 is disposed within the release side pressure chamber 62. The biasing member 66 reacts against the backing plate 56 to bias the piston 58 away from the backing plate 56.

Figure 2:
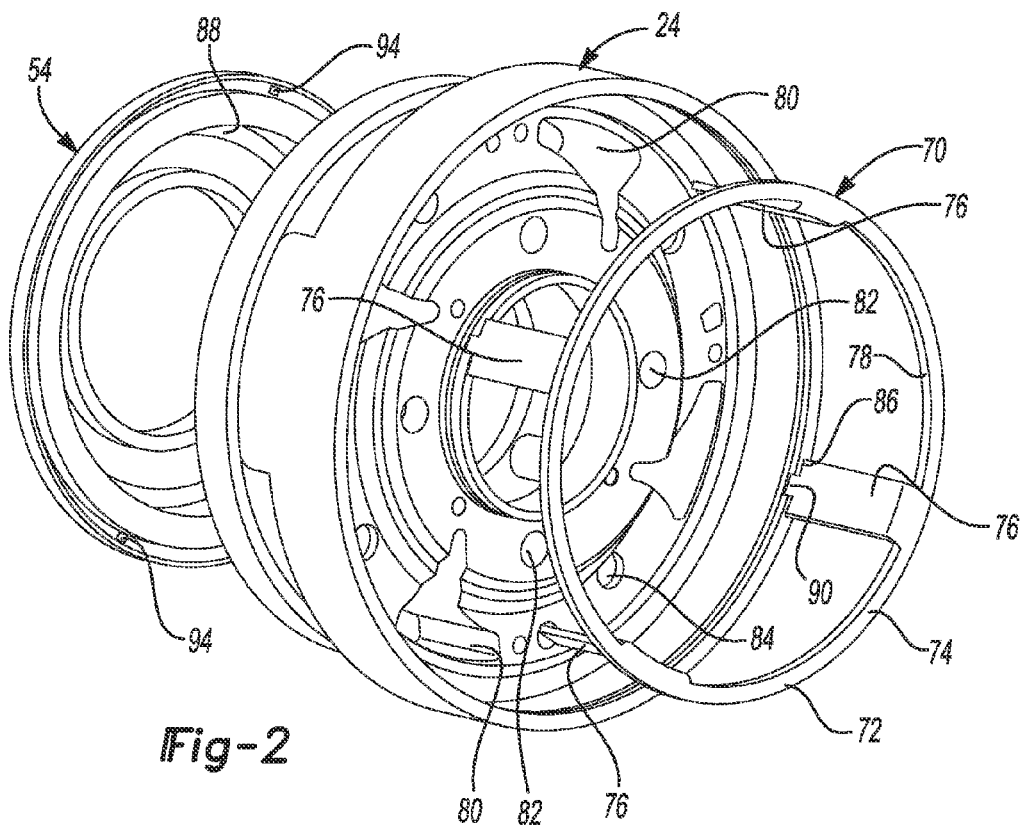
FIG. 2 is an isometric, exploded front view of an assembly used in the transmission according to the principles of the present invention.

Turning to FIG. 2 and with continued reference to FIG. 1, the interplanetary clutch actuator assembly 18 further includes an interplanetary actuator 70 connected to the piston 54 that extends through the planetary carrier member 24 of the planetary gear set 14 to selectively engage the clutch 16. The interplanetary actuator 70 includes an annular plate portion 72 having a clutch contact surface 74 in contact with the clutch 16. A plurality of tab members 76 extend from an inner periphery 78 of the annular plate portion 70. The tab member 76 extend in an axial direction away from the clutch contact surface 74. While there are four tab members 76 shown, it should be appreciated that any number of tab members 76 may be employed without departing from the scope of the present invention.

Figure 3:
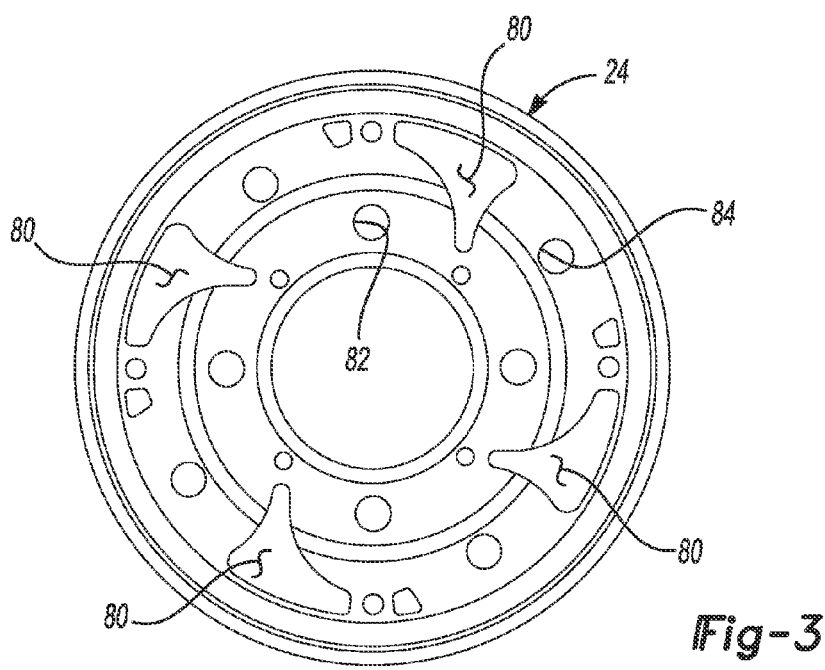
FIG. 3 is an end view of a planet carrier member.

The tab members 76 are disposed through windows 80 formed in the planet carrier member 24, as best seen in FIG. 3. The windows 80 are each disposed between first pinion pin holes 82 and second pinion pin holes 84 that support the first and second pinion pins 26 and 28, respectively. In other words, each of the windows 80 have an angular displacement relative to the pinion pin holes 82, 84. The windows 80 are disposed radially outward at the periphery of the planetary carrier member 24. The windows 80 are sized to receive the tab members 76 while not compromising the strength of the planetary carrier member 24.

End portions 86 of the tab members 76 are disposed within a groove 88 formed in the piston 54. The groove 88 is formed around the entire circumference of the piston 54 and faces the interplanetary actuator 70 and carrier member 24. The groove 88 restrains the tab members 76 from flexing radially outward under centrifugal forces. The tab members 76 may also include optional, axially extended protrusions 90 formed on the end portions 86. The protrusions 90 are disposed in slots 92 formed in the groove 88 of the piston 54.

To engage the clutch 16, hydraulic fluid is communicated through the apply side fluid port 60 into the apply side pressure chamber 58. The pressurized hydraulic fluid acts on the piston 54 and pushes the piston 54 axially towards the clutch 16 against the bias of the biasing member 66. Axial translation of the piston 54 in turn translates the interplanetary actuator 70 such that the tab members 76 slide within the windows 80 of the planetary carrier assembly 24. As the interplanetary actuator 70 moves axially, the clutch contact surface 74 contacts the clutch 16 and compresses the friction discs 58 and clutch plates 60 together, thus rotatingly coupling the planetary carrier member 24 with the ring gear member 34 of the second planetary gear set 36. The clutch 16 is disengaged when the hydraulic fluid communicated to the apply side pressure chamber 58 is ceased and the biasing member 66 moves the piston 54 back to the release position.

The description of the invention is merely exemplary in nature and variations that do not depart from the gist of the invention are intended to be within the scope of the invention. Such variations are not to be regarded as a departure from the spirit and scope of the invention.

What is claimed is:

1. An assembly for a transmission comprising:
   a planetary gear set that defines an axis of rotation and includes a planetary carrier member, the planetary carrier member having a window;
   a piston disposed on a first side of the planetary gear set;
   a clutch pack disposed on a second side of the planetary gear set opposite the first side; and
   an interplanetary actuator in contact with the piston and the clutch pack and slidably disposed in the window of the planetary carrier member.

2. The assembly of claim 1 wherein the interplanetary actuator includes an annular plate portion having a clutch contact surface in contact with the clutch pack.

3. The assembly of claim 2 wherein the interplanetary actuator includes at least one tab member connected to the annular plate portion and disposed within the window of the planetary carrier member.

4. The assembly of claim 3 wherein the tab member is connected to an inner periphery of the annular plate portion and extends axially from the annular plate portion.

5. The assembly of claim 4 wherein the piston includes a circumferential groove, and an end portion of the tab member is disposed within the circumferential groove.

6. The assembly of claim 5 wherein the tab member includes an axial protrusion on the end portion and wherein the axial protrusion is disposed within a slot formed in the groove of the piston.

7. The assembly of claim 1 wherein the planetary carrier member includes a first set of pinion pin holes and a second set of pinion pin holes, and a first set of pinion pins rotatably supporting a first set of planetary gears are disposed in the first set of pinion pin holes and a second set of pinion pins rotatably supporting a second set of planetary gears are disposed in the second set of pinion pin holes.

8. The assembly of claim 7 wherein the window is disposed between and angularly offset from adjacent first and second pinion pin holes in the planetary carrier member.

9. The assembly of claim 1 wherein the piston is disposed within a piston housing, and a backing plate is connected to the piston housing and sealed to the piston.

10. An assembly for a transmission comprising:
 a planetary gear set that defines an axis of rotation and includes a planetary carrier member, the planetary carrier member having a plurality of windows;
 a piston disposed on a first side of the planetary gear set;
 a clutch pack disposed on a second side of the planetary gear set opposite the first side; and
 an interplanetary actuator having an annular plate portion with a clutch contact surface in contact with the clutch pack and a plurality of tab members in contact with the piston, wherein each of the plurality of tab members is disposed within a corresponding one of the plurality of windows in the planetary carrier member, and
 wherein axial translation of the piston translates the interplanetary actuator to compress the clutch pack.

11. The assembly of claim 10 wherein the planetary gear set includes a sun gear member and a ring gear member and the planetary carrier member rotatably supports a first set of planet gears and a second set of planet gears, and wherein the first set of planet gears are each in mesh with both the sun gear member and the second set of planet gears and the second set of planet gears are each in mesh with both the first set of planet gears and the ring gear member.

12. The assembly of claim 11 wherein the planetary carrier member includes a first set of pinion pin holes and a second set of pinion pin holes, and a first set of pinion pins that rotatably support the first set of planetary gears are disposed in the first set of pinion pin holes and a second set of pinion pins that rotatably support the second set of planetary gears are disposed in the second set of pinion pin holes.

13. The assembly of claim 12 wherein the window is disposed between and angularly offset from adjacent first and second pinion pin holes in the planetary carrier member.

14. The assembly of claim 10 wherein the tab members are connected to an inner periphery of the annular plate portion and extend axially from the annular plate portion.

15. The assembly of claim 10 wherein the piston includes a circumferential groove, and an end portion of the tab members are each disposed within the circumferential groove.

16. The assembly of claim 15 wherein the tab members each include an axial protrusion on the end portion and wherein the axial protrusions are each disposed within slots formed in the groove of the piston.

17. The assembly of claim 10 wherein the piston is disposed within a piston housing, and a backing plate is connected to the piston housing and sealed to the piston.

18. An assembly for a transmission comprising:
 a planetary gear set that defines an axis of rotation and includes a planetary carrier member that rotatably supports intermeshed first and second sets of planet gears, the planetary carrier member having a plurality of windows each angularly displaced from the first and second planet gears;
 a piston disposed on a first side of the planetary gear set, the piston having a circumferential groove formed at an outer periphery of the piston;
 a clutch pack disposed on a second side of the planetary gear set opposite the first side; and
 an interplanetary actuator having an annular plate portion with a clutch contact surface in contact with the clutch pack and a plurality of tab members partially disposed in the groove of the piston, wherein each of the plurality of tab members is disposed within a corresponding one of the plurality of windows in the planetary carrier member, and
 wherein axial translation of the piston translates the interplanetary actuator to compress the clutch pack.

19. The assembly of claim 18 wherein the tab members are connected to an inner periphery of the annular plate portion and extend axially from the annular plate portion.

20. The assembly of claim 18 wherein the tab members each include an axial protrusion on the end portion and wherein the axial protrusions are each disposed within slots formed in the groove of the piston.

* * * * *